United States Patent Office 3,427,464
Patented Feb. 11, 1969

3,427,464
SPEED GOVERNING SYSTEMS FOR STEAM TURBINES
William George Watson, Whitley Bay, Northumberland, England, assignor to C. A. Parsons & Company, Limited, Newcastle-upon-Tyne, England, a corporation of Great Britain
Filed Aug. 12, 1965, Ser. No. 479,091
Claims priority, application Great Britain, Aug. 13, 1964, 33,119/64
U.S. Cl. 290—40     7 Claims
Int. Cl. H02p 9/04

ABSTRACT OF THE DISCLOSURE

A speed governing system for a steam turbine comprises a governor valve for controlling the admission of steam to the turbine, governor valve control means for adjusting the opening of the governor valve in response to changes in turbine speed, an emergency stop valve for cutting off the supply of steam to the turbine, emergency stop valve control means for closing the stop valve when the turbine speed exceeds a predetermined value, and anticipatory means for temporarily closing the emergency valve in response to a change in load on the turbine before the turbine speed exceeds the predetermined value. Preferably the anticipatory means is responsive to changes in electrical load on a generator driven by the turbine.

---

This invention relates to speed governing or controlling systems for steam turbines.

It is common practice to control the speed and load of large steam turbine plants such as those used in large electrical power stations by means of governing systems which are basically hydraulic systems. In a typical system a change in turbine speed as a result of a change in load on the turbine alters the governor setting on the turbine, and this produces a change in pressure in oil or other hydraulic fluid used in the system. The change in pressure in the oil alters the position of relays which are associated with governor valves controlling the admission of steam to the turbine. The change of position of the relays effects a change in the valve openings to adjust the flow of steam to the turbine to the new load condition on the turbine.

In addition to governor valves, the governing system may also operate intercept valves in reheat systems. Such valves are provided in connecting steam pipe lines between a reheater and a turbine. The intercept valves are normally fully open, but in the event of the turbine suddenly losing all of its load they close automatically at relatively small overspeed and prevent steam stored in the reheater and connecting pipes from flowing into the turbine, thus avoiding excessive overspeed.

Should the speed of the turbine ever exceed a predetermined value, an emergency overspeed protective system comes into operation. This system operates to shut down emergency stop valves in the system, and also acts to close the governor valves and any intercept valves if present. When the emergency protective system comes into operation and closes the emerengy stop valves, these stop valves normally and preferably remain closed until they are re-set manually. This avoids the possibility of the stop valves opening prematurely.

It is desirable that the governing system be capable of reacting quickly to any sudden loss of load so as to prevent overspeed of the turbine to such an extent that the emergency overspeed protective system comes into operation to shut down the turbine. With modern high power steam turbines the steam conditions under which they operate and the nature of their construction gives them a high accelerating potential. In the event of a sudden loss of load, therefore, the task of the normal governing system becomes increasingly difficult.

The general object of this invention is to provide a speed governing system for a steam turbine which incorporates an anticipatory control to assist the governing system in limiting the overspeed of the turbine when a sudden loss of all load occurs, to reduce preferably to a minimum the occurrence of conditions causing the emergency overspeed protective system to operate.

The invention generally consists in a speed governing system for a steam turbine comprising a governor sensitive to changes in turbine speed and operable to change the pressure in a hydraulic system which includes governor valves for controlling the admission of steam to the turbine, the pressure changes acting to adjust the opening of the valves, the system also incorporating one or more emergency stop valves which form part of an emergency protective system operable to shut down the turbine by cutting off the supply of steam thereto in the event of the turbine speed exceeding a predetermined value, in which speed governing system anticipatory means are incorporated which are initiated by an electric signal produced in response to a change in load on the turbine, the anticipatory means being operable to shut the emergency stop valves and to re-open them after a pre-determined time interval.

The invention also consists in a speed governing system in accordance with the preceding paragraph in which the initiating signal is generated upon the opening of a circuit breaker in the load circuit of a generator driven by the turbine.

The invention further consists in a speed governing system in accordance with the first of the preceding two paragraphs in which the initiating signal is generated by a wattmeter device measuring the electrical load on a generator driven by the turbine.

The invention still further consists in a speed governing system in accordance with the first of the preceding three paragraphs in which the anticipatory means comprise an electrically operated device incorporating a solenoid actuated by the initiating signal and operable to move a plunger in the device controlling the flow of hydraulic fluid to and the release of fluid from a spring loaded release valve, movement of the plunger by the solenoid causing the release valve to open and connect to drain the hydraulic fluid in the system holding open the emergency stop valves, thus reducing the pressure in the hydraulic system and allowing the emergency stop valve to close. The release valve is closed after a predetermined time interval by operation of the solenoid to move the plunger back to its original position.

Other and further objects, advantages and features of the invention will be apparent to those skilled in the art from the ensuing description of an exemplary embodiment of the invention, taken with reference to the accompanying drawings, wherein.

Figure 1:
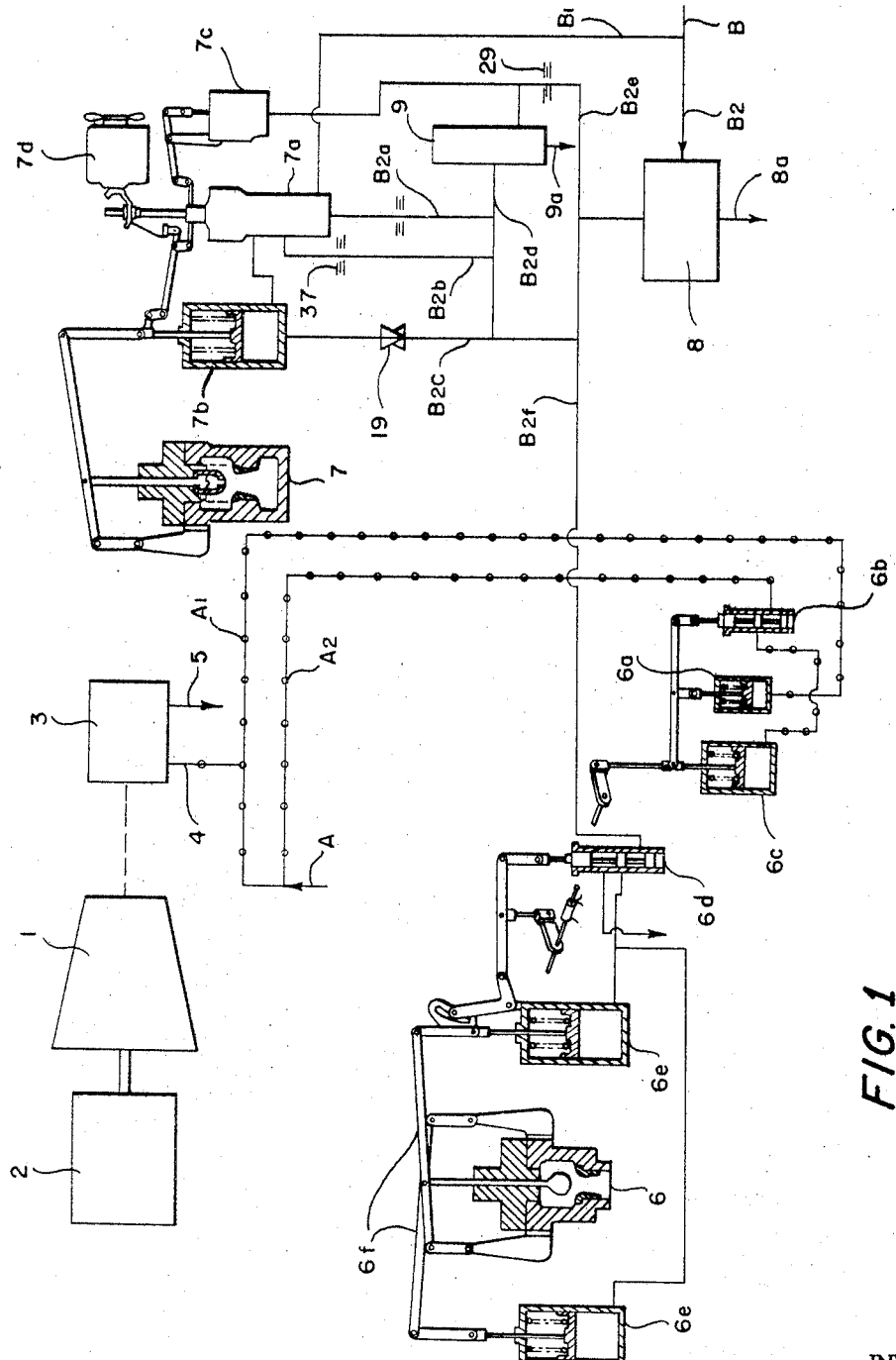
FIGURE 1 shows in diagrammatic form the main components of a governing system in accordance with one form of the instant invention.

Referring to FIGURE 1, a steam turbine plant includes a steam turbine 1 which drives an electric generator 2. Driven from the turbine shaft is a speed governor 3 which forms part of a hydraulic speed governing system. For purposes of description it will be assumed that the hydraulic fluid used throughout the system is oil, although other fluids may be used instead of or in conjunction with oil. Such an additional fluid might, for example, be a fire-resistant fluid. Also, the embodiment which is described and illustrated uses two main circuits, one circuit being power oil which is used to operate the valves, and the other circuit being pilot oil which is at a lower pressure than the power oil and is used to operate relays on the valves. The use of oil in two circuits at different pressures is given by way of example only, and it will be apparent that other systems may be used.

Controlling the admission of steam to turbine 1 is a governor valve 6 and an emergency stop valve 7. These may be duplicated if desired, and there may also be reheat emergency stop valves and intercept valves. Both governor and emergency stop valves have associated therewith power pistons and relays, the details of which will be described below.

Pilot oil is supplied to the governor 3 through connection 4 and can flow to drain from the governor through connection 5. The pilot oil flows in circuit A and divides into two sub-circuits. Sub-circuit $A_1$ includes governor 3 and pilot piston 6a associated with governor valve 6. The other sub-circuit $A_2$ bypasses the governor and acts as a motivating fluid for auxiliary power piston 6c associated with valve 6, the oil of sub-circuit $A_2$ being controlled by auxiliary relay 6b. A power oil sub-circuit $B_{2f}$ connects with the main power pistons 6e through main relay 6d.

Under normal fluctuation of speed of the turbine the governor 3 acts to vary the pressure of the pilot oil in circuit $A_1$. This varies the position of the pilot piston 6a, and movement of the pilot piston alters the position of the plunger in relay 6b, which in turn varies the amount of oil which can pass to or from auxiliary power piston 6c. The auxiliary relay 6b and power piston 6c are linked to main relay 6d as shown so that changes in the position of the auxiliary power piston 6c change the settings of main relay 6d, and this in turn varies the power oil flow to and from main power pistons 6e, hence adjusting the opening of the governor valve 6. In a preferred form two power oil pistons, one at each side, operate each governor valve 6 by lever connections 6f. With this arrangement the forces in the lever systems are balanced, thus eliminating side thrusts on the valve spindle. The arrangement of relays, power pistons and auxiliary relays and power pistons associated with both governor and emergency stop valves is given by way of example only, and other arrangements may be used.

The power oil flows in circuit B which subdivides into sub-circuits $B_1$ and $B_2$. Circuit $B_1$ conveys power oil to the top side of an unbalanced piston 10b (described below with reference to FIGURE 2) in main relay 7a associated wtih emergency stop valve 7. Circuit $B_2$ conveys power oil through an emergency trip device 8, which can be of several well known types, and thence into six branch circuits. First branch circuit $B_{2a}$ leads to the underside of piston 10b in the main relay 7a; second branch circuit $B_{2b}$ leads via the main relay 7a to main power piston 7b which actuates the emergency stop valve 7; a third branch circuit $B_{2c}$ connects directly to the main power piston 7b; a fourth branch circuit $B_{2d}$ leads to electrically operated device 9 which forms part of the anticipatory means sensing sudden loss of load on the turbine; a fifth branch circuit $B_{2e}$ leads to release piston 7c associated with the emergency stop valve 7 and forming part of the anticipatory means; and, as previously stated, a sixth branch circuit $B_{2f}$ leads to main relay 6d of the governor valve 6.

If despite the action of the governor the turbine speed were to increase above a predetermined value, say 10% overspeed, such as may occur in the event of a sudden loss of load, emergency trip device 8 would operate and connect the power oil in branch circuits $B_{2a}$–$B_{2f}$ to drain.

This loss of hydraulic pressure has the effect of shutting rapidly both the governor valve 6 and the emergency stop valve 7. The fall in pressure in the branch circuits of circuit $B_2$ also acts so as to connect power oil in one of the branch circuits to a further drain 9a in the anticipatory device 9, as will be explained in more detail below, so that the closing action of the valve or valves 7 is accelerated by the presence of device 9.

When the emergency overspeed trip device 8 is reset and the pressure in circuit $B_2$ is restored, the governor valves 6 reopen automatically, but the emergency stop valve or valves 7 remain closed and can only be reopened manually after resetting their mechanical controls indicated schematically at 7d.

To prevent such shut downs it is desirable to try to anticipate a sudden shedding of all or a substantial part of its load by the turbine, and toward this end the illustrated system incorporates anticipatory means for rapidly detecting such happenings and shutting the emergency stop valve before there is any substantial speed rise. The anticipatory means comprise device 9 working in conjunction with release piston 7c to keep the valve 7 closed for a period and then to reopen it and return the system to the control of the speed governor.

The device 9 incorporates a solenoid which is made responsive to a signal generated on changes in electrical load on the generator, for example, the opening of a circuit breaker in the generator circuit, or in response to changes in electrical load on the generator as sensed by a wattmetric control. Should the load be removed from the turbine suddenly the device 9 operates to connect power oil under release piston 7c to drain, and movement of the release piston actuates the main relay 7a to open a port or ports therein and connect power fluid under the power piston 7b to drain, thus closing the valve 7. After a predetermined time the solenoid goes back to its original setting, and the pressure of the power oil under piston 7b is automatically restored and the valve 7 reopened.

Figure 2:
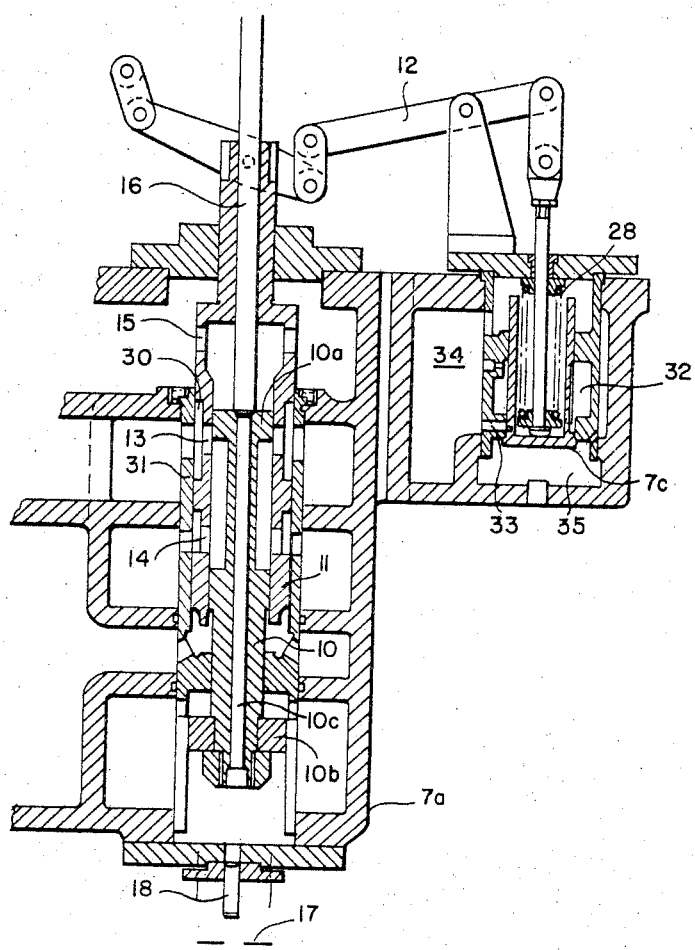
FIGURE 2 is a sectional view of a main relay for controlling the hydraulic pressure at the emergency stop valve, the figure also showing the release piston which forms part of the anticipatory means.

As shown in FIGURE 2, in a preferred form the oil relay for the emergency stop valve comprises a relay plunger 10 which operates in a movable sleeve 11. The sleeve is connected by levers 12 to the power piston 7b and release piston 7c. The relay plunger 10 is formed with a top collar 10a which controls ports 13 in such a way that the underside of the power pistons 7b can be connected to the oil circuit $B_{2b}$ through ports 14, or to drain through ports 15. The bottom of the relay plunger 10 is connected to a piston 10b, the effective area of the bottom side of the piston 10b being greater than that of its top side. Under normal running conditions power oil is fed to the top and bottom sides of the piston 10b from circuits $B_1$ and $B_{2a}$ respectively, and as the pressures in these circuits are equal under normal conditions, there is an upward force acting on the piston 10b because of the greater area of its underside. This force keeps the relay plunger 10 in contact with an operating spindle 16. The release piston 7c is held by oil pressure from circuit $B_{2c}$ against its seat.

To increase the lift of the valve 7 under normal operating conditions, the spindle 16 is raised by local or remote hand control. The relay plunger 10 follows in contact with the spindle and increases the oil admitted to the lower side of the power piston 7b through ports 13, thus causing the piston to rise and lift the valve 7 and at the same time the sleeve 11. This action continues until the sleeve 11 is raised to its neutral position and cuts off the supply of oil to the piston 7b through ports 13.

When the emergency trip device 8 operates, the power oil in branch circuits $B_{2a}$–$B_{2f}$ is connected to drain 8a, thereby dropping the pressure under the relay plunger piston 10b. The pressure above the piston is retained by power oil from circuit $B_1$, thus causing the relay plunger 10 to move downwardly and lose contact with the spindle 16. The downward movement of the relay plunger 10 releases oil from beneath the power piston 7b to drain through ports 15, thus causing the power piston 7b to descend and close the valve 7.

To prevent the relay plunger 10 from rising and reopening the valve 7 when the emergency trip device 8 is reset, the relay plunger 10 has a bore 10c extending throughout its length, and an orifice schematically indicated at 17 is fitted in feed pipe 18 to the space under its piston 10b. This arrangement prevents pressure from building up under the piston 10b when the pressure in circuits $B_{2a}$–$B_{2f}$ is restored, since the oil flows through the bore 10c to drain through ports 15. Before the valve 7 can be reopened by hand, the operating spindle 16 must first be lowered until it again makes contact with the relay plunger 10 and seals the end of the bore 10c, thus preventing the flow of oil to drain. The pressure under the piston 10b can then build up again. The provision of bore 10c in the relay plunger 10 has the further advantage that when the pressure under the piston 10b is released the displaced volume of the piston 10b can flow directly to drain through the bore. This promotes fast action by eliminating pressure loss in the connecting oil pipe forming part of circuit $B_2$ between the piston 10b and emergency trip 8.

To safeguard against the oil relay 7a failing to operate in an emergency, circuit $B_{2c}$ is provided. (See FIGURE 1.) This connection contains a non-return valve 19 and directly connects the space beneath the power piston 7b to the oil circuit $B_2$ after the emergency trip device 7.

Figure 3:
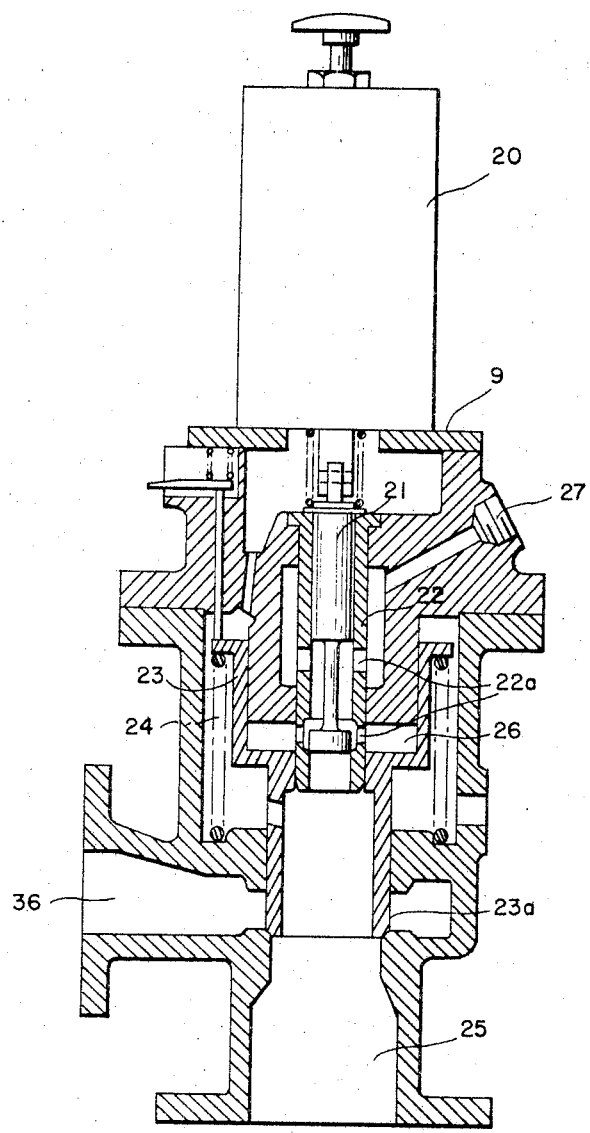
FIGURE 3 is a sectional view through an electric solenoid operated atnicipatory device in accordance with one embodiment of the invention.

In a preferred form the device 9 comprises, as shown in FIGURE 3, a solenoid 20 which actuates a plunger 21. The plunger 21 moves to control the opening of ports 22a in a bush 22. Sliding on the outside of the bush 22 is a power piston 23 which is spring loaded by means of spring 24. The piston 23 has a valve body 23a formed integrally therewith, which valve acts as an oil release valve when open to allow power oil in the device to flow to drain 25, this drain being indicated at 9a in FIGURE 1.

Under normal operating conditions the solenoid 20 is deenergized, the plunger 21 is in its lowermost position, and the oil release valve is closed, shutting off the drain 25. Power oil from circuit $B_{2d}$ has access to space 26 at the top of piston 23 through inlet 27 and ports 22a, and holds the release valve closed. In the event of a load rejection by the turbine, the solenoid 10 is energized and moves the plunger 21 upwardly, and power oil flows from space 26 to drain through ports 22a and the inside of valve body 23a. The sudden collapse in the power oil pressure in space 26 above the piston 23 causes the piston to be raised under the action of spring 24, thus opening the release valve and connecting through inlet 36 the power oil under the release piston 7c to drain 25. The upward movement of the plunger 21 cuts off the lower ports 22a thus preventing the flow of power oil through inlet 27 to the space above the piston 23, and hence the pressure of the power oil in the circuit $B_2$ is not affected.

The collapse of the pressure below release piston 7c causes the piston 7c to move downwardly under the action of spring 28 (see FIGURE 2), and the sleeve 11 of main relay 7a is raised. While this is taking place no substantial change of the oil pressure in circuits $B_1$ and $B_2$ occurs since an orifice 29 (see FIGURE 1) is fitted in the supply line $B_{2e}$ to the piston 7c, thus avoiding an excessive flow of oil when the release valve 23a opens. Because these pressures do not change, the relay plunger 10 in the main oil relay 7a of the emergency stop valve remains in contact with the operating spindle 16. Raising of the sleeve 11 as a result of downward movement of the piston 7c connects the power oil beneath power piston 7b to drain through ports 15 and also through annular space 30 which is connected to drain as a result of the raising of sleeve 11 relative to fixed bush 31, and this accordingly causes downward movement of the power piston and closure of the valve 7.

To obtain quick action the release piston 7c has a reservoir 32 associated therewith, and when the piston 7c drops displaced oil can flow past the piston into the reservoir 32. Reservoir 32 provides means whereby the oil pressure under the piston 7c can collapse quickly, and the time taken for the pressure collapse to take place is substantially independent of the length of pipe line connecting the underside of the release piston 7c and the release valve body 23a of the device 9. Thus the length of the pipe line connecting the release piston 7c and the device 9 is not critical, and the positioning of the device 9 is not governed by the position of the piston 7c. A further effect of this feature is that one device 9 can serve a plurality of release pistons and hence serve a plurality of emergency stop valves. For example, in the case of a large reheat steam turbine, there can be a plurality of main and reheat emergency stop valves, all of which can be operated from a single device 9. A second "device 9" may be used as a safeguard against failure of either one of the devices to operate.

While the piston 7c is held against its seat the reservoir 32 is connected to drain through ports 33 and space 34, but when the piston moves downwardly these ports 33 are closed and the reservoir becomes a sealed chamber connected only to space 35 below the piston 7c. By this means the pressure under the release piston 7c is restored when release valve 23a in device 9 closes and the piston 7c is returned to its normal position against its seat.

After a predetermined time, usually the time taken to close the emergency stop valve, a suitable delay mechanism, such as a time relay, for instance, causes the solenoid to return to its original position, with consequent downward movement of plunger 21 and closure of the valve 23a. The pressure under the release piston 7c is thus restored. This in turn acts to raise the release piston and lower the sleeve 11 to reopen the valve 7. Lowering of the sleeve 11 reconnects power oil from circuit $B_{2b}$ to the power piston 7b through ports 13 and valve 7 reopens. Reopening of valve 7 allows the governor to resume control of the turbine speed. Orifice 37 in the supply line $B_{2b}$ to the main relay 7a limits the rate at which the valve 7 reopens, thus avoiding excessive demand on the power oil, and therefore the pressures in circuits $B_1$ and $B_2$ are maintained and the plunger 10 maintains contact with the operating spindle 16.

As mentioned earlier, device 9 accelerates the closing of the emergency stop valves when they are tripped by operation of the emergency trip 8. The fall in pressure in branch circuits $B_{2a}$–$B_{2f}$ as a result of the action of emergency trip 8 releases oil from above the piston 23 of device 9, thus opening the release valve 23a and actuating release piston 7c.

It will be apparent from the foregoing description and illustraiton that the anticipatory control acts to close the emergency stop valves, and these close, when a load rejection occurs, before there is any substantial rise of turbine speed. By operating on the emergency stop valves in this manner, excessive speed rise is avoided in the event of a governor valve or valves failing to operate, since the turbine speed does not have to rise to the tripping speed before the emergency stop valves are closed.

It will be apparent to those skilled in the art that the invention itself is susceptible to incorporation in other embodiments different from the embodiment described and illustrated herein, and accordingly it should be understood that the foregoing embodiment is to be taken as illustrative rather than as limiting of the invention, and that the invention is to be limited only by the subjoined claims interpreted in the light of the foregoing description. Having described fully an embodiment of my invention in the manner required by the patent statutes, I claim:

1. In a steam turbine control system, a steam turbine, a governor valve for controlling the admission of steam to the turbine, governor valve control means for adjusting the opening of said governor valve in response to changes in turbine speed, an emergency stop valve for cutting of the supply of steam to the turbine when in a closed position, emergency stop valve control means for closing said stop valve when the turbine speed exceeds a predetermined value, and anticipatory means for temporarily closing said emergency stop valve in response to a change in load on the turbine before the turbine speed exceeds said predetermined value.

2. Apparatus as set forth in claim 1 wherein said emergency stop valve is actuated by a hydraulic motor, and wherein said anticipatory means comprises an electrically operated device incorporating a solenoid operable in response to a change in load on the turbine, and means actuated by said solenoid for temporarily varying the hydraulic pressure in said hydraulic motor in the sense to effect temporary closing of said stop valve.

3. In a steam turbine system, a steam turbine; a governor driven by said turbine; a generator driven by said turbine; a speed governor valve in the inlet steam line to said turbine for controlling the admission of steam thereto under the control of said speed governor; an emergency stop valve in said stream line; a hydraulic motor for maintaining said emergency stop valve in an open position when hydraulic pressure is supplied thereto and for closing said stop valve when hydraulic pressure is removed from the hydraulic motor; a main relay for selectively connecting said hydraulic motor to a hydraulic pressure system or to drain; an emergency trip device operative in response to a predetermined turbine overspeed for causing said main relay to connect said hydraulic motor to drain so as to close said emergency stop valve; means in the main relay for preventing automatic reclosing of the emergency stop valve after closure by the emergency trip device; and anticipatory means responsive to a change in load on the turbine for temporarily causing said main relay to connect said hydralic motor to drain so as to temporarily close said emergency stop valve before said turbine reaches the predetermined overspeed at which the emergency trip device becomes operative.

4. Apparatus as set forth in claim 3 wherein said main relay comprises a first movable member actuated by said emergency trip device for selectively connecting said hydraulic motor to hydraulic pressure or to drain, and a second movable member actuated by said anticipatory means for selectively connecting said hydraulic motor to hydraulic pressure or to drain, and means for preventing automatic return of said first movable member to its pressure-connecting position after it has been moved to its drain-connecting position.

5. Apparatus as set forth in claim 4 wherein said anticipatory means comprises a release piston operatively connected to said second movable member, means biasing said release piston in a first direction such as to move said second movable member to its drain-connecting position, means applying hydraulic pressure to said release piston to move the release piston in a second direction opposite to said first direction, and solenoid operated valve means for selectively connecting to drain said hydraulic pressure on said release piston in response to a change in load on the turbine so as temporarily to close said emergency stop valve.

6. In a steam turbine system, a steam turbine; a speed governor controlled inlet valve for controlling admission of steam to the turbine; an emergency stop valve for cutting off the supply of steam to the turbine; hydraulic fluid operated means for holding open said stop valve during normal operation; an emergency protective system for connecting said hydraulic fluid to drain in response to predetermined turbine overspeed, so as to close said stop valve; and anticipatory means operative in response to a change in load on the turbine for temporarily connecting said hydraulic fluid operated means to drain, so as temporarily to close said stop valve before the turbine reaches said predetermined overspeed, and for subsequently closing said drain connection so as to effect re-opening of said stop valve and to restore turbine control to said speed governor.

7. Apparatus as set forth in claim 6 wherein said anticipatory means incorporates a solenoid actuated valve means for connecting and disconnecting said hydraulic fluid to and from drain.

References Cited

UNITED STATES PATENTS

| | | | |
|---|---|---|---|
| 1,858,939 | 5/1932 | Reid | 290—40 |
| 1,935,292 | 11/1933 | Griscom et al. | 290—40 |
| 1,950,594 | 3/1934 | Bryant | 137—27 |
| 2,000,753 | 5/1935 | Griscom et al. | 290—40 |
| 2,243,225 | 5/1941 | Schwendner | 317—19 |
| 2,404,968 | 7/1946 | Leyer | 290—40 |
| 2,828,448 | 3/1958 | Perkins et al. | 317—19 |
| 3,188,812 | 6/1965 | Knirsch | 317—31 X |

ORIS L. RADER, *Primary Examiner.*

G. SIMMONS, *Assistant Examiner.*

U.S. Cl. X.R.

317—19, 27, 31; 290—52